April 22, 1969          W. H. STENBY          3,440,358
ANNOUNCING INDICATOR FOR CONTINUOUS READOUT OF
DIFFERENT VARIABLES Filed April 12, 1966          Sheet 1 of 2

INVENTOR.
Walter H. Stenby

INVENTOR.

Walter H. Stenby

United States Patent Office 3,440,358
Patented Apr. 22, 1969

3,440,358
ANNOUNCING INDICATOR FOR CONTINUOUS
READOUT OF DIFFERENT VARIABLES
Walter H. Stenby, 98 Riverside Drive,
New York, N.Y. 10024
Continuation-in-part of application Ser. No. 174,357,
Feb. 14, 1962. This application Apr. 12, 1966, Ser.
No. 547,705
Int. Cl. G11c 15/08; G08b 7/00
U.S. Cl. 179—100.1                                    6 Claims

ABSTRACT OF THE DISCLOSURE

Measuring instruments continuously measure different physical values represented by recorded announcements. The recordings of any selected measuring instrument are repeatedly read out and the respective varying values audibly announced over a speaker when a key associated with the respective measuring instrument is selected and actuated by the pilot of an aircraft whose visual attention is concentrated on another task.

---

The present invention is a continuation-in-part application of my copending application Ser. No. 174,357 filed Feb. 14, 1962, now abandoned.

The present invention relates to a position announcing indicator arrangement for instruments, and more particularly to apparatus for audibly announcing information regarding the position of any selected measuring instrument of a plurality of measuring instruments.

One object of the present invention is to provide means for announcing a value measured by a measuring instrument by a reproduction of a recorded human voice stating the measured value.

Another object of the present invention is to select a single instrument from a number of measuring instruments, and to effect a reproduction of a recorded human voice stating the value of a variable measured by the selected measuring instrument.

It is also an object of the present invention to effect an announcement of the value measured by the measuring instrument only when an operator desires such an announcement.

A position announcing indicator arrangement according to one embodiment of the invention comprises an apparatus, such as a measuring instrument, movable between a plurality of information representing positions which are announced by a recorded voice. The apparatus may include several order elements, for example, indicator wheels associated with different decimal orders.

If the apparatus is a simple measuring instrument, such as a thermometer, a single record carrier with a single row of recordings is sufficient. If the apparatus has several order elements associated with different decimal orders, a plurality of record carriers is provided, each of which has a row of recordings of a human voice, and each record carrier is driven by one of the order elements of the apparatus to move between a series of indicating positions in which different recordings are located in a readout position. The recordings of several record carriers are aligned in the readout direction and are read out by a pick-up head moved by drive means over the aligned recordings so that the numbers represented by the positions of the order elements are successively announced by a human voice.

Several measuring instruments are combined to form an announcing system. Manually operated selector means, preferably including keys arranged in a key board, are connected to the drive means of each instrument for selectively actuating the same. The respective selected and actuated drive means effects reading out of the recording or recordings representing the position of the selected instrument and the value measured by the same. This arrangement is advantageously applied where many measuring instruments are provided for measuring physical variables, for example in an airplane or submarine. The term "physical variable" is used herein to denote a variable condition occuring in nature and pertaining to matter, and does not include time. Any instrument can be selected, and the value measured by the same at the respective moment is announced by a human voice. The selection is directly effected by an operator depressing a key associated with the respective instrument.

The novel features which are considered as characteristic for the invention are set in particular in the appended claims. The invention will be best understood from the following description of specific embodiments when read in connection with the accompanying drawings, in which:

Figure 2:
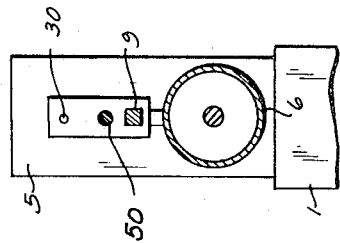
FIG. 2 is a cross-sectional view of the embodiment of FIG. 1.
Figure 1:
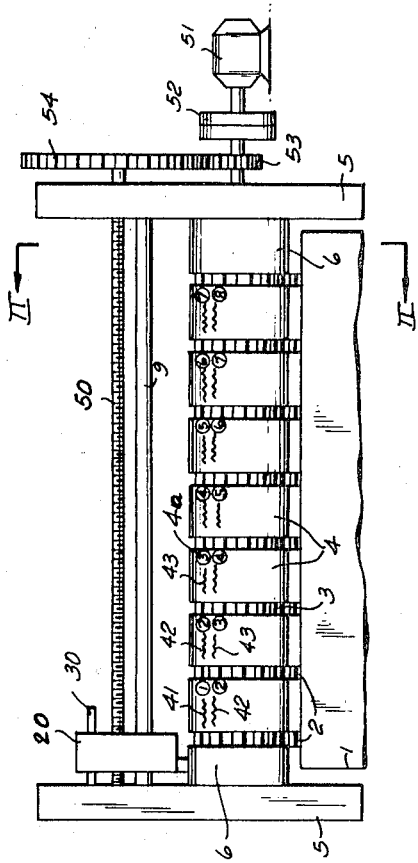
FIG. 1 is a fragmentary schematic elevation illustrating one embodiment of the invention.

Referring now to the drawings, and more particularly to FIGS. 1 and 2, a calculator or measuring instrument schematically indicated at 1, has a plurality of order elements 2 which are movable between ten digital positions representing different numbers. The order elements 2 have gear teeth meshing with gear teeth of corresponding gears 3, each of which is connected to an ordinal record carrier means 4 so that the record carrier means 4 are controlled by the calculator to assume indicating positions representing a number registered in the calculator or a value measured by a measuring instrument. The record carrier means 4 correspond to number wheels of a conventional calculator, and may be provided with indicia indicating the digits from 0 to 9, and such digits representing a number registered in the calculator are aligned in axial direction, and may be read by the operator through a narrow axially extending window, not shown.

The number wheels assume an indicating position for indicating a number introduced into the calculating machine and the same or other number wheels may be used for indicating the result of a calculating operation, such as a total. The record carrier means 4 of the present invention may be operated by the order elements 2, 3 to turn between indicating positions representing either the result of a measuring operation, or the result of the calculating operation.

While the number wheels of conventional calculators indicate digits, each record carrier means on indicating drum 4 according to the present invention is provided with recordings 41, 42, 43, etc., which respectively correspond to the digits 1, 2, 3, etc. The recordings 41, 42, 43, etc. extend in axial direction on the cylindrical peripheral surfaces of the record carrier means 4, and each record carrier means 4 has ten recordings which respectively correspond to the digits from 0 to 9 and are circumferentially spaced about the periphery of the record carrier means 4 in the same manner as indicating indicia 4a are spaced about the periphery of conventional number wheels. Indicia 4a are preferably actually provided on the record carrier means 4, so that they may be visually observed by the operator. Supports 5 support means on which the record carrier means 4 are mounted for turning movement, and two end members 6 having a peripheral surface corresponding to the shape of of record carrier means 4 are located between the supports 5 and the record carrier means.

A guide means 9 of prismatic shape is supported on supports 5, and extends parallel to the axis of rotation of the record carrier means 4. A pick-up head 20 is mounted on guide means 9 for straight movement between the illustrated home position located on member 6 on the left as viewed in FIG. 1 and an end position located on member 6 on the right as viewed in FIG. 1. During such movement the pick-up head passes in axial direction successively over the record carrier means 4. The recordings 41, 42, 43, etc., which are located in the path of movement of the pick-up head 20 are in a readout position, and produce impulses in the pick-up head 20 when the same passes over the recordings in readout position.

On the record carrier 4, recordings are made of a human voice saying, for example, the words, one, two, three, four, five, six, seven, eight, nine, zero. In the illustrated position, the recordings in readout position over which the pick-up head 20 passes are, starting with the highest order on the left, recordings of a human voice saying zero, one, two, three, four, five, six.

A threaded spindle is turnably mounted in supports 5, and driven from a motor 51 through a coupling 52, and gears 53 and 54. The threaded spindle 50 passes through a corresponding nut, not shown, in the pick-up head 20, so that the pick-up head moves along the guide means 9 when motor 51 rotates spindle 50. A switch actuator 30 is mounted on the pick-up head shiftable in the direction of movement of the pick-up head and is shifted to the right as viewed in FIG. 1 when the pick-up head 20 arrives in the illustrated home position, since switch actuator 30 abuts an abutment on support 5. When pick-up head 20 arrives in its end position, switch actuator 30 abuts the other support 5 and shifted to the left.

Figure 3:
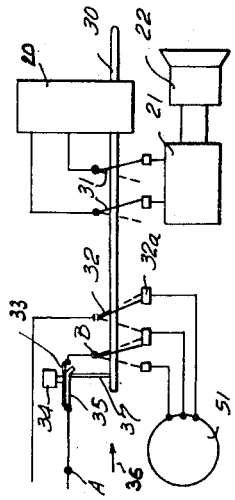
FIG. 3 is a diagram illustrating an electric circuit in accordance with the present invention.

The function of the switch actuator 30 will be best understood with reference to FIG. 3. The pick-up head 20 is connected to an amplifier 21 by a switch 31. A speaker or earphone 22 is connected to the amplifier 21. In the position of switch 31 in which the announcing means 21, 22 are connected to the pick-up head 20, the impulses created in the pick-up head when the same passes over recordings 41, 42, 43, etc., in read-out position are supplied to the amplifier 21, transformed into sound waves, and announced by the speaker 22. When the pick-up head 20 arrives in its end position, the switch actuator 30 is shifted by the abutment means on support 5, and switch 31 is shifted to the open position indicated in broken lines in FIG. 3. Consequently, the announcing means 21, 22 are disconnected from the pick-up head 20, and during the following travel of the pick-up head 20 in opposite direction from the end position to the home position, no sound is produced by the recordings which would otherwise be read-out in the wrong opposite direction from the right to the left.

Switch actuator 30 also operates a reversing switch 32 by which motor 51 is reversed. When the switch actuator is in the illustrated position, motor 51 will turn in one direction so that spindle 50 will effect movement of the pick-up head from the home position to the end position resulting in announcing of the respective position of the calculator. Reversing switch 32 will be shifted in the end position of the pick-up head so that motor 51 is reversed, reverses the direction of rotation of spindle 50 and effects return of pick-up head 20 from the end position to the home position.

A main switch 33 is located in the circuit of the motor, and is provided with a pushbutton or key 34 controlled by an operator.

The illustration of the key or push-button 34 is schematic, and switch 33 may be operated by the operating keys of the calculator 1. For example, when a number has been introduced into a calculator and an operating key is pressed to enter the number, switch 33 is closed. In the same manner, when the total key of the calculator is actuated, switch 33 is closed.

The indicator arrangement operates in the following manner: A number is introduced into the calculator, or the order elements of the calculator assume a position corresponding to a total or result after actuation of a total key. If the apparatus is a measuring instrument of the type disclosed in the U.S. Patent 3,163,819, the order elements assume a position representing a measured value. The indicator wheels and record carrier means 4 assume indicating positions indicating the respective position of the order elements of the apparatus. Recordings corresponding to the digits registered in the several order elements of the apparatus will be placed in a readout position located in the path of movement of the pick-up head 20.

For example, in the position illustrated in FIG. 1, a recording of a human voice saying the word zero will be in the readout position in the highest order, and a recording of a human voice saying the word six will be in the readout position in the lowest order.

When the operating key of the calculator is depressed, or when an independent key 34 is depressed, switch 33 is closed and motor 51 is energized, starts to rotate, and rotates the threaded spindle 50 so that pick-up head 20 travels from the left to the right as viewed in FIG. 1 from the illustrated home position to an end position. Impulses are produced in the pick-up head 20 by the read-out recordings of the several record carrier means 4 and since switch actuator 30 is in a position in which switch 31 connects the announcing means 21, 22 to the pick-up head, the positions of the several order elements of the calculator are successively announced by the speaker 22.

When the pick-up head 20 arrives in its end position, switch actuator 30 is shifted to the left as viewed in FIG. 1, motor 51 is reversed by reversing switch 32, and announcing means 21, 22 are disconnected from the pick-up head 20. Since the motor is reversed, the direction of rotation of spindle 50 is also reversed, and pick-up head 20 returns from the end position to the home position, while switch 31 is in the disconnected position. Upon arrival of pick-up head 20 in the home position, switch actuator 30 is again shifted so that switch 31 again connects the announcing means 21, 22 with the pick-up head and motor 51 is reversed.

Switch actuator 30 is shifted in the direction of the arrow 36 in FIG. 3 beyond this position so that the arm 37 of switch actuator 30, which engages a projection 35 on switch 33 opens switch 33 whereby the circuit of motor 51 is interrupted so that the pick-up head 20 stops. The contacts of the reversing switch 32 are slightly extended so that reversing switch 32 continues to connect motor 51, while switch 31 interrupts the connection between announcing means 21, 22 and the pick-up head 20.

However, if the operator holds key 34 of switch 33, switch 33 cannot open, and switch actuator 30 cannot move beyond the position illustrated in FIG. 3 in solid lines so that the travel of the pick-up head 20 is repeated, and the same announcement is made a second time. Of course, if in the meantime the position of the record carrier means 4 has been changed, a different announcement will be made.

Assuming that arm 37 has opened switch 33 in the home position, the next time switch 33 will be closed, switch actuator 30 will be first shifted a small distance to close switch 31, so that the pick-up head is connected to the announcing means 21, 22 when the pick-up head starts its movement.

Figure 6:
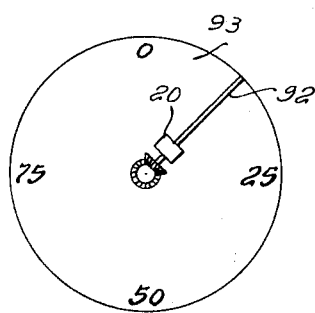
FIG. 6 is a fragmentary schematic front view of a modified embodiment of the invention.
Figure 7:
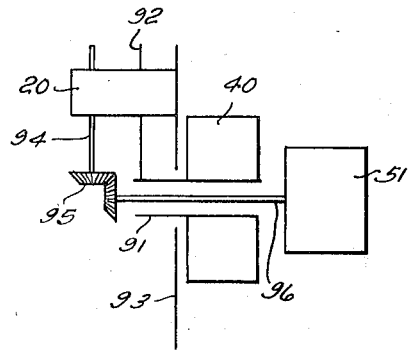
FIG. 7 is a fragmentary schematic sectional view illustrating a constructive detail of the embodiment of FIG. 6.

FIGS. 6 and 7 illustrate a modified embodiment of the invention having a flat, dial shaped record carrier. This embodiment is particularly suited for measuring instruments. The mechanism 40 of a measuring instrument turns through a hollow shaft 91 a pointer-like guide means 92 corresponding to guide means 9 described with reference to FIGS. 1 and 2. Guide means 92 moves over a stationary dial-like record carrier 93 which has, for example, one hundred radially extending, angularly spaced recordings, not shown, in the region of the periphery thereof. A pick-up head 20 is mounted on guide means 92 and is driven by a threaded spindle 94 which is connected by a pair of bevel gears 95 to a shaft 96 passing through the hollow shaft 91 and being driven by a drive motor 51. The circuit of FIG. 3 is also used in the embodiment of FIGS. 9 and 10. When switch 33 is closed, drive motor 51 starts, and since spindle 94 turns, the pick-up head 20 moves first outwardly along guide means 92 and then back to its inner home position. The position of guide means 92 depends only on the value measured by the measuring instrument. For example, the measured value may be 20 pounds pressure or weight in which event guide means 92 will assume a corresponding position on the dial-like record carrier 93, and located aligned with a recording of a human voice saying "20 pounds." Any time switch 33 is actuated while the measuring instrument measures the value 20 pounds, the pick-up head 20 will read out this value. The record carrier means may be provided with numbers, so that the guide means 92 also serves a pointer. Giude means 92 is preferably controlled to move in steps, or several identical recordings are very closely spaced from each other so that the same announcement is made in slightly displaced positions of the guide means 92.

In all embodiments of the invention, the record carriers preferably have magnetizable surfaces, and the recordings are magnetic.

Figure 4:
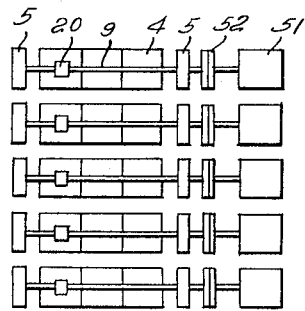
FIG. 4 is a fragmentary schematic plan view illustrating an announcing system comprising a plurality of measuring instruments.
Figure 5:
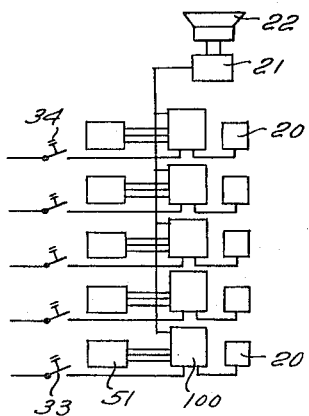
FIG. 5 is a diagram illustrating a circuit used in the announcing system illustrated in FIG. 4.

FIGS. 4 and 5 illustrate an announcing system suited for an airplane or submarine in which the positions of several measuring instruments are selectively announced. FIG. 4 schematically shows five measuring instruments with indicating arrangements corresponding to FIG. 1, each indicating arrangement having a motor 51, a guide means 9, and a pick-up head 20. Measuring instruments responding to fluctuating values of different physical values, such as speed, pressure, temperature, altitude and fuel amount, control the positions of record carrier means 4. A single record carrier may be provided with as many recordings as is required by the measuring range of the instrument, or three record carriers corresponding to three decimal orders may be provided as described with reference to FIG. 1. Each measuring instrument turns the respective record carrier 4 to a position in which a recording announcing the measured value can be read-out by the respective pick-up head 20. FIG. 5 shows five circuits corresponding to FIG. 3, the box 100 indicating the switch elements 30 to 37. Five manually operated keys or buttons 34 controlling selector switches 33 from a keyboard and constitute manually operated selector means. When the operator depresses any one selected button or key 34, the corresponding switch 33 is actuated whereupon the respective motor 51 will be started and move the pick-up head 20 over the record carrier of the respective measuring instrument so that the value of the physical variable measured at this moment by the measuring instrument will be announced by the announcing means 21, 22. Only a single announcing means 21, 22 is provided for all pick-up heads 20, the circuit of the announcing means 21, 22 being illustrated in a simplified manner in FIG. 5. It is also possible to provide a single drive motor and to drive the couplings 52 through a transmission, in which event electromagnetic couplings are provided which are energized and de-energized by the switches 33 to effect rotation of spindle 9 and movement of pick-up head 20.

Five indicating arrangements are shown in FIGS. 4 and 5, but it will be understood that any number of measuring instruments may be provided with the indicator arrangement of the present invention, and that the measured value of any measuring instrument can be learned by the operator by simply depressing the corresponding selector key 34 of the respective switch 33. While the key board formed by keys 34 is located near the operator's seat, the measuring instruments may be located at distant parts of the airplane or submarine, although schematically shown in adjacent position in FIG. 4.

The keys 34 may be constructed to remain in switch closing position until again actuated by the operator, in which event the positions of the respective measuring instruments are continuously announced since the pick-up head continues to repeat its travel until switch 33 is disconnected. In this manner the pilot of an airplane can be continuously informed of the readings of the instruments during landing or take-off operations when he observes the ground and has no time to observe the dials of the instruments. When the pilot depresses the key 34 of a selected instrument the positions of the respective measuring instrument are repeatedly announced so that the pilot is informed of the improvement obtained by his corrective actions.

The keyboard is advantageously provided with a keylock as described in the U.S. Patent 3,208,417 which prevents the simultaneous actuation of two keys so that simultaneous announcements by two instruments are not possible. This mechanism also causes the return of each actuated key to its normal inoperative position when another key is depressed for selecting another instrument.

It will be understood that each of the announcing arrangements described above, or two or more together, may also find a useful application in combination with other types of instruments differing from the apparatus described above.

While the invention has been illustrated and described as embodied in a manually controlled arrangement in which a human voice announces the positions of a selected measuring instrument, it is not intended to be limited to the details shown, since various modifications and structural changes may be made without departing in any way from the spirit of the present invention.

I claim:
1. A position announcing arrangement for measuring instruments, comprising, in combination, a set of measuring instruments for continuously measuring different variables, each measuring instrument being movable between a plurality of indicating positions respectively representing different measured values of the respective variable, and including record carrier means having recordings of spoken announcements of measured values, read-out means cooperating with different recordings in said indicating positions, respectively, and drive means reciprocating one of said means relative to the other for effecting repeated reading out of the recording associated with the measured value;

announcing means connected with said readout means of all said measuring instruments for audibly announcing the readout recording; and manually operated selector means movable between a plurality of positions and adapted to be placed in anyone of said positions by an operator, said selector means including a set of selector members having same number as said set of measuring instruments and being respectively connected with said drive means of the same for individually and continuously actuating in said positions said drive means of any selected measuring instrument in accordance with the decision of the operator and independently of the other measuring instruments whereby the varying values of a selected variable of the variables continuously measured by said measuring instruments are announced in repeated announcements only when the operator desires information regarding the momentary varying values of the selected variable.

2. An arrangement according to claim 1 wherein said selector members include keys arranged in a key board.

3. A position announcing arrangement according to claim 1 wherein said record carrier means of each measuring instrument has at least one row of spaced recordings of a human voice; and wherein each readout means is movable across said row and is driven by the respective drive means.

4. A position announcing arrangement according to claim 1 wherein each drive means is electrically actuated and includes an electric circuit; and wherein said manually operated selector means include a plurality of selector switches respectively connected into said circuits and being said selector members, and a plurality of manual keys for operating said switches, respectively, so that upon actuation of a selected key the drive means of the corresponding selected instrument is actuated and moves the respective readout means over a recording to cause announcing of the value measured by the selected instrument.

5. An arrangement according to claim 1 wherein said manual keys are arranged in a key board.

6. A position announcing measuring instrument comprising a part responsive to a physical variable to move to different positions corresponding to measured values; record carrier means having a series of recordings of a voice announcing successive values of the physical variable to which said part is responsive; readout means cooperating with said record carrier means in said position of said part for reading out the recording representing the value of the variable to which the instrument has responded at the time of reading out, said readout means being movable over the readout recording between a home position and an end position; announcing means controlled by said readout means to audibly announce the value represented by the readout recording; switch means for connecting said readout means with said announcing means; drive means for moving said readout means from said home position to said end position and back; a switch actuator mounted on said readout means for movement with the same and having two positions for opening and closing said switch means; and abutments engaged by said switch actuator directly before said readout means arrives in said home position so that said switch actuator is shifted to one of said positions and closes said switch means, and before said readout means arrives in said end position so that said switch actuator is shifted to the other position and opens said switch means whereby said annoucing means is disconnected from said readout means during movement of said readout means back to said home position.

References Cited

UNITED STATES PATENTS

| | | | |
|---|---|---|---|
| 2,571,973 | 10/1951 | Walker | 179—100.2 X |
| 2,896,945 | 7/1959 | Waldman | 179—6 X |
| 3,015,702 | 1/1962 | Vogel et al. | 179—100.2 |
| 3,081,431 | 3/1963 | Werner et al. | 179—100.2 X |
| 3,141,069 | 7/1964 | Withey | 179—100.1 X |
| 3,161,729 | 12/1964 | McCarty et al. | 179—100.2 |
| 3,163,819 | 12/1964 | Calhoun | 179—100.2 X |
| 3,264,452 | 8/1966 | Rieth | 179—100.2 X |

BERNARD KONICK, *Primary Examiner.*

RAYMOND F. CARDILL, JR., *Assistant Examiner.*

U.S. Cl. X.R.

179—100.2